United States Patent
Lewe et al.

(10) Patent No.: US 12,418,225 B2
(45) Date of Patent: Sep. 16, 2025

(54) METHOD FOR PRODUCING AN ELECTROMAGNETIC COMPONENT FOR AN ELECTRIC MACHINE

(71) Applicant: ThyssenKrupp Steel Europe AG, Duisburg (DE)

(72) Inventors: Tobias Lewe, Münster (DE); Karsten Machalitza, Mülheim an der Ruhr (DE); Volker Kamen, Herne (DE); Marco Tietz, Düsseldorf (DE)

(73) Assignee: THYSSENKRUPP STEEL EUROPE AG, Duisburg (DE)

( * ) Notice: Subject to any disclaimer, the term of this patent is extended or adjusted under 35 U.S.C. 154(b) by 8 days.

(21) Appl. No.: 18/479,208

(22) Filed: Oct. 2, 2023

(65) Prior Publication Data

US 2024/0039377 A1 Feb. 1, 2024

Related U.S. Application Data

(62) Division of application No. 17/612,049, filed as application No. PCT/EP2020/051176 on Jan. 17, 2020, now Pat. No. 11,811,278.

(30) Foreign Application Priority Data

May 20, 2019 (DE) .................. 10 2019 113 290.8

(51) Int. Cl.
*H02K 15/00* (2025.01)
*H01F 41/02* (2006.01)
(Continued)

(52) U.S. Cl.
CPC ......... *H02K 15/02* (2013.01); *H01F 41/0233* (2013.01); *H02K 1/148* (2013.01)

(58) Field of Classification Search
CPC ..... H02K 15/02; H02K 1/148; H01F 41/0233
See application file for complete search history.

(56) References Cited

U.S. PATENT DOCUMENTS 3,558,396 A * 1/1971 Denyssen ............ H01F 41/0233
  336/219
3,834,013 A * 9/1974 Gerstle ................ H02K 15/021
  148/120

(Continued)

FOREIGN PATENT DOCUMENTS

DE 38 29 068 C1 1/1990
DE 10 2012 001 744 8/2013

(Continued)

OTHER PUBLICATIONS

Office Action Issued By Japanese Patent Office on Nov. 29, 2022 in Japanese Patent Application No. 2021-566574.

(Continued)

*Primary Examiner* — Paul D Kim
(74) *Attorney, Agent, or Firm* — Rankin, Hill & Clark LLP

(57) ABSTRACT

A method for producing an electromagnetic component for an electric machine is provided. The method includes providing a metal sheet as a starting material; punching out a number of lamellae from the metal sheet; heat-treating the lamellae; and joining the heat-treated lamellae to form the component or a portion of the component. The electromagnetic component to be produced can be a laminated core, for example a stator core or a rotor core, and can be provided for use with the electric machine such as an electric motor.

11 Claims, 1 Drawing Sheet

(51) Int. Cl.
*H02K 1/14* (2006.01)
*H02K 15/02* (2006.01)
*H02K 15/14* (2025.01)
*H02K 15/16* (2025.01)

(56) References Cited

U.S. PATENT DOCUMENTS

| | | | | |
|---|---|---|---|---|
| 8,276,426 | B2* | 10/2012 | Musat | B21D 28/22 |
| | | | | 72/336 |
| 2005/0034295 | A1 | 2/2005 | Meacham et al. | |
| 2006/0066168 | A1 | 3/2006 | Shoykhet | |
| 2018/0006509 | A1* | 1/2018 | Kato | H02K 15/02 |
| 2019/0291403 | A1* | 9/2019 | Bursy | B32B 37/18 |
| 2020/0299518 | A1 | 9/2020 | de Zeeuw et al. | |
| 2022/0220593 | A1 | 7/2022 | Lewe | |

FOREIGN PATENT DOCUMENTS

| | | |
|---|---|---|
| DE | 102015012172 | 3/2017 |
| DE | 102016225853 | 6/2018 |
| EP | 2612942 | 7/2013 |
| GB | 1574986 | 9/1980 |
| JP | 61117220 | 6/1986 |
| JP | 10261535 | 9/1998 |
| JP | 2001510015 | 7/2001 |
| JP | 200329984 | 10/2003 |
| JP | 2005235948 | 9/2005 |
| JP | 2005268589 | 9/2005 |
| JP | 200938915 | 2/2009 |
| JP | 201138773 | 2/2011 |
| JP | 5750196 | 5/2015 |
| JP | 2018143034 | 9/2018 |
| JP | 2018145492 | 9/2018 |
| JP | 2018534388 | 11/2018 |
| WO | 03/014404 | 2/2003 |
| WO | 2012059588 | 5/2012 |
| WO | 2017050892 | 3/2017 |

OTHER PUBLICATIONS

International Search Report filed in PCT/EP2020/051176 mailed Apr. 2, 2020.
Rolf Tzscheutschler, et al.; "3. Technologische Grundverfahren zur Herstellung von Magnetkorpern" In Technologie des Elektromaschinenbaus, Jan. 1990, Verlag Technik, GMBH, Berlin, XP055491484, ISBN: 978-3-341-00851-5 Seiten 204-271, pp. 209, 236-239.

* cited by examiner

METHOD FOR PRODUCING AN ELECTROMAGNETIC COMPONENT FOR AN ELECTRIC MACHINE

This is a division of application Ser. No. 17/612,049 filed Nov. 17, 2021, now U.S. Pat. No. 11,811,278.

TECHNICAL FIELD

The present invention relates to a method for producing an electromagnetic component, in particular a laminated core, which is designed for example as a stator core or as a rotor core, for an electric machine such as an electric motor or a generator.

BACKGROUND ART

The mode of operation of electric machines, for example of electric motors, has long been known. The electric motor continues to gain in importance, not least in light of the increasing use of electric motors in individualized passenger transport, often also referred to with the buzzword "electromobility." Essential components of every electric motor are a stator and a rotor, the term stator denoting a stationary part of the motor and the term rotor denoting a moving part of the motor.

One challenge when providing electric motors is to increase the efficiency of the electric motor, for example the provided power per volume and/or the efficiency factor, as part of an economically reasonable effort.

One concept for providing efficient electric motors is the production of stators and/or rotors or of parts of the stators and/or rotors as a so-called stator core or rotor core. In this case, said components are assembled as laminated cores, also known as lamella stacks, from individual so-called lamellae. The term "lamella" denotes a shaped part that has been removed from an electrical steel sheet or electrical steel strip. A common method for this is to punch out the lamella. The lamella stacks are then assembled from a large number of thin lamellae by stacking the lamellae together and electrically insulating them from one another, either partially or preferably completely.

The production of such a component, in particular such a laminated core, always includes the steps of producing lamellae and interconnecting the lamellae. The connection is preferably established in such a way that, after the connection, the lamellae are partially, preferably completely, electrically insulated from one another, which preferably means that two adjacent lamellae are not galvanically interconnected.

The individual lamellae are typically produced by means of punching. The connection of the punched lamellae to form a laminated core can be achieved with a variety of known methods, for example by screwing, by applying clips, by welding or by punch-stacking. However, due to the mechanical action generated during the connection process, each of these production methods known to a person skilled in the art is associated with a negative impact on the electromagnetic properties of the finished laminated core that prevail after the connection. In particular, mechanical stresses, which are inevitable in a mechanical connection, at least to some extent, can have a negative impact on the magnetic properties and the course of magnetic field lines within the laminated core, which directly results in a negative impact on the efficiency of the electric motor comprising the laminated core. An electrical connection between two or more lamellae, which usually occurs during the punch-stacking, leads to additional losses.

An expedient option for reducing the negative impact of mechanical effects on the lamellae and at the same time achieving good insulation among the lamellae is to use adhesives as a connecting means. These adhesive systems also have insulating properties similar to electrically insulating varnishes.

A procedure known to a person skilled in the art is the use of so-called baking varnishes. The use of baking varnishes for gluing punched electrical steel sheets is described, for example, in DE 38 29 068 C1. One procedure for using baking varnish is the coating of a metal sheet, in particular a metal strip, the subsequent punching out of individual lamellae from the metal sheet, the aligned positioning of the individual lamellae with respect to one another and the subsequent heat treatment of the resulting sheet stack for a defined period of time and at a defined temperature. In many cases, the lamellae are pressed against one another during the heat treatment, for example by applying a force to the end face, preferably with a uniform surface force, in an axial direction of the laminated core, which is directed into the interior of the laminated core. Typical reaction temperatures are 150 degrees Celsius to 250 degrees Celsius, and a typical time for the baking varnish to react is 30 to 150 minutes with a subsequent cooling phase, although the exact parameters depend naturally on the specific baking varnish used and the geometry of the component and the adhesion device. Excellent electromagnetic properties of stator cores and/or rotor cores can generally be achieved using this procedure.

BRIEF SUMMARY

In light of the desire for further increased efficiency, the object of the invention is to provide electromagnetic components and electric machines with improved conversion of electromagnetic energy into mechanical energy.

The object is achieved by a method having the features of claim 1 and the developments thereof.

The method according to the invention has the following steps:
A) providing a metal sheet, in particular a metal sheet not coated with an adhesive, as a starting material,
B) punching out a number of lamellae from the metal sheet,
C) heat-treating the lamellae,
D) joining the heat-treated lamellae to form the laminated core or a portion of the laminated core.

These steps can be implemented in what is known as an inline process, for example, but an implementation in stations that are passed through sequentially is also possible.

The term "metal sheet" generally denotes a rolled product made of a metal material and, in addition to a light-gauge metal sheet or a thick-gauge metal sheet, can in particular also denote a metal strip, for example made of a soft magnetic material, a steel strip or an electrical steel strip.

Lamellae are punched out of the metal sheet. The punching out of step B) is preferably carried out using a punching tool. This is a tool with which one, preferably more than one, such as four, lamellae are punched out of the metal sheet. The lamellae are preferably punched using the punching tool in such a way that a number of connecting webs, for example three connecting webs, remain between the relevant punched-out lamella and the metal sheet originally transported to the punching tool, so that the punched-out lamella is still an integral part of the metal sheet. This is used to allow further transport of the lamellae together with the metal sheet, in particular the metal strip, through an inline system.

However, the lamellae may also be immediately separated from the metal sheet with the punching.

The essential inventive concept is that the lamellae are subjected to a heat treatment after the lamellae are punched out and before the lamellae are joined. A heat treatment refers in particular to the heating of a lamella to a predetermined temperature or in a predetermined temperature range, the holding of this temperature for a predetermined period of time and the preferably slow cooling of the lamella in a furnace.

The heat treatment can be carried out in a furnace section as part of the inline process or alternatively can be carried out in an intermediate step that takes place in a closed furnace.

It has been found that the losses occurring in an electric machine could be significantly reduced if a stator and/or rotor made from a laminated core produced according to the invention were used, i.e. with their production involving a heat treatment of the lamellae which is carried out after the lamellae are punched and before the lamellae are joined. The inventors attribute this to the fact that the punching introduces internal stresses and plastic deformations into the lamellae, which have a negative impact on the course of magnetic field lines in the finished laminated core. Particularly in embodiments in which one of the materials mentioned below is used as a starting material and one of the preferred adhesives mentioned below is used, outstanding synergistic effects are obtained which favor the production of excellent electromagnetic components, since a high reactivity and storage stability of the adhesive are associated with very good magnetic material properties.

In a first alternative development of the method, the joining of the lamellae comprises, sequentially for each of the lamellae of the number of lamellae, the following steps:

D1) applying a thermally activated adhesive to a surface of the lamella to form an adhesive coating, D2) optionally inspecting the adhesive coating using an optical inspection method, D3) activating the adhesive of the adhesive coating, wherein, thereafter, the lamellae having the activated adhesive are superimposed in a position-aligned and/or angularly aligned manner and are subjected, on their end face, to a compressive force acting in the axial direction.

All of steps D1) to D3) are carried out after step C) and, as is self-explanatory, in the sequence D1), D2), D3). The starting material for joining the lamella is thus the lamella that has already been heat-treated.

The application of the adhesive can in particular be carried out as a complete or substantially complete application of the adhesive to the surface of the lamella. In the context of this development, the term "substantially" means that at least 50 percent, 55 percent, 60 percent, 65 percent, 70 percent, 72 percent, 74 percent, 76 percent, 78 percent, preferably 80 percent, 82 percent, 84 percent, 86 percent, 88 percent, particularly preferably 90 percent, 91 percent, 92 percent, 93 percent, 94 percent, 95 percent, in particular 96, 97, 98, 99 or 100 percent of the area of at least one side of the lamella is covered with adhesive.

The adhesive applied to the lamella can be thermally treated in a drying region, for example as a separate drying unit or as a drying section of an inline system, in order to dry the adhesive.

This variant of the method is preferably carried out in what is known as an inline process in an inline system.

However, variants carried out sequentially are also possible, provided that the essential aspect whereby the joining is carried out after the heat treatment is taken into account.

The term "inline system" refers to the fact that a number of processing stations, namely at least those mentioned above, are arranged in a predetermined sequence, and a metal sheet, for example an electrical steel strip, fed into the inline system is processed automatically at the predetermined stations.

The activation is preferably brought about by illuminating the adhesive coating with infrared radiation using a means for emitting infrared radiation.

The means for emitting infrared radiation can in particular be designed as an NIR emitter, that is to say a lamp that is designed for emitting electromagnetic radiation in the NIR wavelength spectrum, i.e. with wavelengths between 780 nm and 3 $\mu$m.

In a preferred method, the shaped parts are illuminated in an NIR wavelength range, with a wavelength between 0.8 micrometers and 1.2 micrometers preferably being used and, particularly preferably, a maximum of the luminous power being achieved with NIR radiation with a wavelength between 0.85 micrometers and 0.9 micrometers.

If the method is implemented in an inline system, the inline system preferably has an ejection punch. This ejection punch is a punch which, by applying force perpendicularly to the sheet surface, sequentially separates the lamellae which are still connected to the metal sheet, in particular the metal strip, by one or more webs, by separating the web or webs from the metal sheet after the adhesive has been activated.

Within a short period of time after activation, the lamellae must be brought together and then the adhesive must be allowed to dry and set.

When using suitable adhesive compositions, the metal sheet has a surface with a short activation time of, for example, 0.5 seconds to 1 second and a short hardening time of only a few seconds.

The means for emitting infrared radiation may be (in terms of the processing sequence) arranged behind the punching tool, and are preferably arranged between the punching tool and an ejection punch, and have:

at least one upper lamp which is directed in a punching direction onto a first lamella surface or at least one lower lamp which is directed against a punching direction onto a second lamella surface present on the other side of the punching tool, or both at least one upper and at least one lower lamp.

The alignment of the lamp on the lamella surface does not necessarily have to be at a right angle, but can also be carried out at a different angle.

Whether the first and/or the second lamella surface is illuminated with the lamp naturally depends on whether lamellae coated on one or both sides are used. In the first case and in the second case, lamellae with an adhesive coating on one side can be used, and in particular in the third case lamellae with an adhesive coating on both sides can be used with the advantage that lamellae arranged one on top of the other stick together very well.

In a second alternative development of the method, the lamellae are joined in a different way, namely, sequentially for each of the lamellae of the number of lamellae, with the following steps:

D1) applying a thermally activated adhesive to a surface of the lamella to form an adhesive coating, with an optional subsequent thermal treatment to dry the adhesive coating, D2) optionally inspecting the adhesive coating using an optical inspection method, D3) superimposing the lamellae in a position-aligned and/or angularly aligned manner, D4) applying a compressive force acting in the axial direction to the end face of the superimposed lamellae, D5) heating the superimposed lamellae, which are at least temporarily subjected to the compressive force, for a predetermined period of time at a predetermined temperature to activate the adhesive of the adhesive coating.

If necessary, after step D1) and before or after step D2), the adhesive coating can be thermally dried in a drying station.

The second alternative development of the method differs from the first alternative development in particular in that the applied adhesive is not activated by means of thermal activation, for example with infrared radiation, of the individual lamellae before the individual lamellae are brought together, but rather the thermal activation takes place after the lamellae have been brought together, namely by heating them in a furnace.

In both of the alternative developments, the thermally activated adhesive is preferably applied by providing the adhesive as an aqueous dispersion which is applied to the lamellae. The application is preferably carried out by means of spraying, but application by means of a roll-to-roll method, in particular with rolls rotating in opposite directions, is also possible.

The application of the adhesive can in particular be carried out as a complete or substantially complete application of the adhesive to the surface of the lamella. In the context of this development, the term "substantially" means that at least 50 percent, 55 percent, 60 percent, 65 percent, 70 percent, 72 percent, 74 percent, 76 percent, 78 percent, preferably 80 percent, 82 percent, 84 percent, 86 percent, 88 percent, particularly preferably 90 percent, 91 percent, 92 percent, 93 percent, 94 percent, 95 percent, in particular 96, 97, 98, 99 or 100 percent of the area of at least one side of the lamella is covered with adhesive.

The adhesive applied to the lamella can be thermally treated in a drying region, for example as a separate drying unit or as a drying section of an inline system, in order to dry the adhesive.

This is a procedure which is similar to the known baking varnish method and differs from the first alternative in terms of the procedure for activating the adhesive.

The predetermined period of time in step D5 is preferably between 5 minutes and 60 minutes, particularly preferably between 10 and 40 minutes.

A temperature between 100° C. and 250° C., preferably between 100° C. and 200° C., and particularly preferably between 100° C. and 150° C. is provided as the predetermined temperature in step D5.

In both of the alternative developments explained above, an electrical component, a stator core or a part of a stator core is produced by gluing together lamellae which have been subjected to a heat treatment after being punched out and before being glued. This combines the above-mentioned improvement in the magnetic behavior of the individual lamellae as a result of the heat treatment, which according to investigations by the inventors is due to a stress reduction and/or recrystallization or grain enlargement in particular in edge regions of the lamellae, with a method for joining the lamellae which does not occur without a permanent change in shape, electrical interconnection of the lamellae or an exertion of pressure on one or more lamellae of the electrical component or the stator core. The result is the provision of electrical components, in particular stator cores or laminated cores, which are eminently suitable for use in electric machines, in particular electric motors with high efficiency, in particular with a high efficiency factor.

In a development of the method, at least one electromagnetic component is produced using one of the previously described methods and at least one electromagnetic component is produced using a conventional method. This allows electric machines to be produced in such a way that the properties of the electromagnetic components are set as required. For example, for a high-speed, high-efficiency electric motor, the rotor is punch-stacked and therefore has at least the original mechanical properties of the starting material and thus has a high (operational) strength against plastic deformation or bursting that is relevant here. The stator, on the other hand, is annealed and glued using the method described above and therefore has the lowest relevant losses here.

In other words: An electric machine can be provided which has a first electromagnetic component which is produced using a method according to the invention or one of its developments, and a second electromagnetic component which is produced using a conventional method, i.e. in particular produced from lamellae punched out of a metal sheet and joined, in particular glued, for example by means of baking-varnish gluing, without carrying out a heat treatment of the lamellae analogously to step C of the method according to the invention or one of its developments after the punching out and before the joining. This means that the first electromagnetic component in step C) has heat-treated lamellae and the second electromagnetic component has lamellae that have not been heat-treated after the punching out. In particular, the first electromagnetic component can be the stator of the electric machine and the second electromagnetic component can be the rotor of the electric machine. Such a procedure has the advantage that the stator has the excellent electromagnetic properties that can be achieved according to the invention, whereas, in the case of the rotor, a reduction in the mechanical properties that are important for the rotor as a rotating component, in particular strength, is avoided due to the fact that annealing is not carried out.

The following statements apply to the first alternative development, the second alternative development and to all their variants and developments.

The inspection of the adhesive coating in step D2 is preferably carried out using an optical inspection method. In particular, the method can be automated in such a way that a lamella is only used in the joining process if the optical inspection method detects a sufficiently uniform thickness distribution of the adhesive coating, and otherwise the lamella is removed from the method as a reject.

For the optical inspection method, it is particularly preferred to capture a thermal image of the adhesive coating, preferably the not-yet-dry adhesive coating, by means of a thermal imaging camera. In this way, only samples that are insufficiently coated with adhesive can be reliably detected and sufficient mechanical stability of the laminated core can be ensured. When a sample is to be regarded as inadequately coated is at the discretion of a person skilled in the art tasked with carrying out the invention and is irrelevant for the basic functioning of the described development of the method according to the invention.

In order to superimpose the lamellae in a position-aligned and/or angularly aligned manner, the lamellae are preferably inserted into a receiving device in which a positioning region is located. The positioning region is used to position the lamella introduced into the positioning region in relation to the lamellae already present there in a positioned-aligned or angularly aligned manner, which ultimately results in a stack of lamellae that are aligned with one another and provided with activated adhesive.

The positioning region can be, for example, a cylindrical tube which is designed for example as a cylindrical hollow tube with a lateral-surface cross section which substantially corresponds to the cross section of the shaped parts and is aligned therewith in the intended positioning. To exert the required compressive force, a pressure ram is provided which applies an axial force to the end face of the lamella stack.

Applying a compressive force acting in the axial direction to the superimposed lamellae means applying a compressive force which is exerted in a direction perpendicular to the lamella surface to compress the individual lamellae against one another on an end face of the stack of joined lamellae, preferably with uniform surface pressure.

The metal sheet is preferably a panel made from an electrical steel strip or is an electrical steel strip, and the metal sheet particularly preferably consists of a non-grain-oriented electrical steel strip.

It is preferred to use a material which, in addition to Fe and unavoidable impurities, contains the following elements (all figures in wt. %):
  0.1 to 3.50 Si,
  0.01 to 1.60 Al,
  0.07 to 0.65 Mn,
  optionally up to 0.25 P.

It is understood that, when specifying metal alloys within the scope of this application, the wt. % figures of all constituents, including unavoidable impurities, add up to 100 wt. %.

The material is preferably a non-grain-oriented steel which, in addition to Fe and unavoidable impurities, contains the following elements (all figures in wt. %):
  0.1 to 3.50 Si,
  0.01 to 1.60 Al,
  0.07 to 0.65 Mn,
  optionally up to 0.25 P.

Particularly preferably, in addition to one of the above, the following conditions are also met (all figures in wt. %):
  2.3 to 3.40 Si,
  0.3 to 1.1 Al,
  0.07 to 0.250 Mn,
  optionally up to 0.030 P, remainder Fe and unavoidable impurities.

The non-grain-oriented electrical steel strip or the non-grain-oriented metal sheet preferably has specific core losses at P1.0; 50 Hz in the range of from 0.7 to 7 W/kg and at P1.5; 50 Hz in the range of from 1.8 to 15 W/kg and/or a polarization at J2500 in the range of from 1.45 T to 1.71 T and at J5000 in the range of from 1.6 T to 1.8 T, determined in accordance with DIN EN 60404-2.

In a more preferred embodiment, the non-grain-oriented electrical steel strip or the non-grain-oriented metal sheet has specific core losses at P1.0; 50 Hz in the range of from 0.8 to 3.5 W/kg and at P1.5; 50 Hz in the range of from 1.9 to 8.0 W/kg and/or a polarization at J2500 in the range of from 1.47 T to 1.71 T and at J5000 in the range of from 1.58 T to 1.80 T, determined in accordance with DIN EN 60404-2.

In a further preferred embodiment, the non-grain-oriented electrical steel strip or the non-grain-oriented metal sheet has specific core losses at P1.0; 50 Hz in the range of from 1.0 to 1.5 W/kg and at P1.5; 50 Hz in the range of from 2.2 to 3.3 W/kg and/or a polarization at J2500 in the range of from 1.47 T to 1.57 T and at J5000 in the range of from 1.58 T to 1.65 T, determined in accordance with DIN EN 60404-2.

The non-grain-oriented electrical steel strip or the non-grain-oriented metal sheet preferably has specific core losses at P1.0; 400 Hz in the range of from 8 to 120 W/kg; at P1.5; 400 Hz in the range of from 18 to 360 W/kg; and/or a polarization at J2500 in the range of from 1.45 T to 1.75 T and at J5000 in the range of from 1.45 T to 1.85 T and at J10,000 in the range of from 1.50 and 1.95 T, determined in accordance with DIN EN 60404-2.

In a further preferred embodiment, the material has specific core losses at P1.0; 400 Hz in the range of from 10 to 25 W/kg; at P1.5; 400 Hz in the range of from 25 to 49 W/kg; and/or a polarization at J2500 in the range of from 1.45 T to 1.75 T and at J5000 in the range of from 1.45 T to 1.85 T and at J10,000 in the range of from 1.50 and 1.95 T, determined in accordance with DIN EN 60404-2.

The non-grain-oriented electrical steel strip or the non-grain-oriented metal sheet preferably has a yield point in the longitudinal direction under standard normal conditions of from 190 to 610 MPa and a maximum tensile strength of from 310 to 740 MPa and a minimum elongation at break A80 of from 6 to 48%, measured in accordance with DIN EN ISO 6892-1, and a hardness Hv5 of 100-250.

In a particularly preferred embodiment, the material has a yield strength in the longitudinal direction at room temperature of from 310 to 600 MPa and a maximum tensile strength of from 400 to 640 MPa and an elongation at break A80 of from 7 to 32%, measured in accordance with DIN EN ISO 6892-1, and a hardness Hv5 of 130-250.

The material preferably has an anisotropy at P1.0; 400 Hz in the range of from 5 to 17%.

The starting material can also be a soft magnetic material which, in addition to Fe and unavoidable impurities, consists of (all figures in wt. %):
  0.1 to 4.0 Si,
  0.01 to 2.60 Al,
  0.07 to 3.0 Mn,
  optionally up to 0.5 P,
  optionally up to 0.015 B,
  optionally up to 0.2 Sb,
  optionally up to 0.01 Zn,
  optionally up to 5 Cr,
  optionally up to 5 Ni,
  optionally up to 0.25 V,
  optionally up to 0.5 Sn,
  optionally up to 0.01 As,
  optionally up to 0.3 Nb,
  optionally up to 0.5 W,
  optionally up to 0.85 Zr,
  optionally up to 0.2 Mo,
  optionally up to 1.0 Cu,
  optionally up to 0.5 Ti,
  optionally up to 0.5 C,
  optionally up to 0.01 Ce.

Metal sheets, in particular electrical steel strip, with a thickness between 0.05 and 2.5 mm are suitable and preferably used, with thicknesses between 0.1 and 1.0 mm being preferred. Depending on the application of the electric machine, thicknesses between 0.5 and 1.0 mm are particularly preferred.

According to one embodiment, heat treatment is carried out as stress relief annealing. This means in particular that the lamellae are heated to a temperature or to temperatures within a temperature range which is below the Ac1 temperature of the material used in each case. For example, a temperature between 200° C. and 650° C. can be provided as the temperature. The heating takes place slowly, for example with uniform heating of less than 10 Kelvin per minute. Thereafter, the temperature is usually maintained for a longer period of time, for example at least 30 minutes, preferably at least 1 hour, before slow cooling, for example cooling under an inert gas atmosphere and/or in air, takes place. Stress relief annealing is the most suitable method if the metal sheet used as the starting material already has the desired grain sizes.

Alternatively, the heat treatment can be carried out as soft annealing. The heating takes place slowly, for example with uniform heating of less than 10 Kelvin per minute. Thereafter, the temperature is maintained for a longer period of time, for example at least 1 minute, preferably between 1 hour and 7 hours and more preferably between 1.4 hours and 4 hours before slow cooling, for example cooling under an inert gas atmosphere and/or in air, takes place. Alternatively, the heat treatment can be carried out as recrystallization annealing. The heating takes place slowly, for example with uniform heating of less than 10 Kelvin per minute. Thereafter, the temperature is maintained for a longer period of time, for example at least 30 minutes, preferably between 1 hour and 7 hours and more preferably between 1.5 hours and 4 hours before slow cooling, for example cooling under an inert gas atmosphere or, depending on the temperature, in air, takes place. The temperature and the holding time based on the temperature are preferably selected depending on whether grain growth is desired and which target grain size is desired for which starting material (alloy, grade, grain size, geometry and the like).

The temperature and time specifications defined above for the annealing step relate to a heat treatment that is carried out as a sequential heat treatment step in an annealing furnace. If the annealing is carried out in a continuous process, the annealing conditions must of course be adapted, which is unproblematic for a person skilled in the art.

Both surfaces of the lamellae are particularly preferably coated with a thermally activated adhesive so that, when the lamellae are joined, one adhesive surface adjoins the other adhesive surface with the advantage of very good adhesion.

An adhesive is preferably used which contains:
60 parts by weight of an epoxy resin based on its solid resin form,
0.5 to 15 parts by weight of a latent hardener,
1 to 15 parts by weight of a latent accelerator.

The adhesive preferably has 1 to 10 parts by weight of the latent hardener, particularly preferably 2 to 5 parts by weight of the latent hardener.

The term "latent hardener" denotes a substance which is used to harden the epoxy resin, but which has to be activated for hardening, in particular by supplying chemical and/or thermal energy. The latent hardener is added to the adhesive as a solid in powder form, for example.

The term "latent accelerator" denotes a substance which accelerates the hardening of the epoxy resin by the latent hardener. The attribute "latent" in connection with the accelerator relates to the fact that the accelerator must also be activated beforehand by chemical and/or thermal energy in order to fulfill its function. The latent accelerator is added to the adhesive as a solid in powder form, for example.

The above composition relates to the mixture of the components present as solid bodies in the specified parts by weight to form an adhesive mixture which, in dispersion and/or solution with a suitable liquid, becomes the adhesive which can form an adhesive coating. In a usable state, i.e. in a form suitable for coating, the adhesive with the specified components is preferably present as a dispersion of the above composition in a dispersion medium, in particular as an aqueous dispersion.

Because lamellae are coated with a thermally activated adhesive, electromagnetic components, in particular stator cores or rotor cores, of very high quality can be produced in a flexible manner. Because the adhesive must first be thermally activated, the adhesive function can be performed at a desired point in time or in a desired method step after the lamellae have been removed from the metal sheet and coated with the adhesive, for example by punching. Within a short period of time after activation, the lamellae must be brought together and then the adhesive must be allowed to dry and set. This is the only way to create flawless, non-delaminated and geometrically precise, mechanically stable cores.

With an adhesive composition as specified above, the lamellae each have a surface with a short activation time of 0.5 seconds to 1 second, for example, and a short hardening time of only a few seconds. These properties go hand in hand with a comparatively high temperature resistance and a comparatively high insulation and aging capacity.

The epoxy resin present in the adhesive that is preferably used comprises one or more epoxy resin components with more than one epoxy group, of which preferably at least one epoxy resin has a softening point greater than 50° Celsius.

The epoxy resins can be aliphatic, cycloaliphatic or aromatic epoxy resins, for example. Aliphatic epoxy resins contain components that carry both an aliphatic group and at least two epoxy resin groups. In a preferred embodiment of the present invention, the epoxy resin is bisphenol A epoxy resin.

The latent hardener used is a substance or a mixture of substances which preferably enter into hardening reactions with the epoxy resins of the adhesive at temperatures in the range of from 80° Celsius to 200° Celsius.

The hardener can contain dicyandiamides, aziridine derivatives, triazine derivatives, imidazolines, imidazoles, o-tolylbiguanide, cyclic amidines, organic hexafluoroantimonate or hexafluorophosphate compounds or BF3 amine complexes. The compounds can be used individually or in combination.

In one embodiment, the adhesive can contain 1 to 10 parts by weight of a latent accelerator, preferably 1 to 5 parts by weight of a latent accelerator, particularly preferably 2 to 5 parts by weight of a latent accelerator, very particularly preferably 2 to 4 parts by weight of a latent accelerator.

In another preferred embodiment, the adhesive furthermore has 0.2 to 8 parts by weight, preferably 0.2 to 4 parts by weight of absorption additive. The absorption additive that can be provided according to this further concept is selected from the group of lamp blacks and/or from the group of water-soluble dyes.

The term absorption additive denotes a substance that absorbs thermal radiation. A substance that absorbs thermal radiation is associated in particular with the advantage of allowing the more efficient use of a method in which the thermal activation of the adhesive takes place by means of electromagnetic radiation, in particular by means of irradiation with light in the IR wavelength range, preferably in the NIR wavelength range.

The adhesive preferably contains one or more of the insulation additives known to a person skilled in the art, and the term "insulation additives" refers to additives specifically provided to increase the electrical resistance of the adhesive. The insulation additives can be contained in the adhesive in amounts of from 1 to 10 parts by weight, preferably 1 to 5 parts by weight.

The latent accelerator preferably has a urea derivative.

Particularly preferably, the urea derivative is an N, N-dimethylurea or an N,N'-dimethylurea or a bifunctional urea derivative, preferably with two urea groups as functional groups, very particularly preferably a 4,4'-methylene-bis-(phenyldimethylurea), or a mixture of several of the above.

The latent accelerator contained in the adhesive preferably consists of at least 50 wt. %, more preferably at least 90 wt. %, even more preferably at least 98 wt. %, and especially preferably consists completely of 4,4'-methylene-bis-(phenyldimethylurea).

The adhesive coating can be applied to the lamellae on one or both sides. If an adhesive coating is applied on both sides, the thickness of the coating can be the same, but different thicknesses can also be provided.

The preferred thickness of the adhesive coating, i.e. the thickness of the coating on one side in the case of a one-sided adhesive or the total thickness of the adhesive coating on both sides in the case of a two-sided adhesive coating, is between 1 micrometer and 20 micrometers, preferably between 2 and 10 micrometers, particularly preferably between 4 micrometers and 8 micrometers.

All of the named adhesives that can advantageously be used are advantageous not least in that they can be provided as an aqueous dispersion and are thus suitable for application to the lamellae, for example by means of spraying.

It is also particularly advantageous that, due to the high reactivity of the adhesive, only a comparatively short and low heat input into the adhesive coating is required to join the lamellae, so that step C) according to the invention in particular is and remains decisive for the mechanical properties of the lamellae, and so the mechanical properties of the finished component can be adjusted largely conclusively by optimizing a single step.

Potential advantages arise, for example, for the electromagnetic, mechanical and thermal machine design, the possibility of choosing a different metal sheet, greater freedom of construction in the lamella design and advantages with regard to possible component tolerances and media and/or heat guidance. Further advantages arise in terms of the component and machine production (for example when handling compact and solid components) and mechanical processing. Further advantages in electric machines with one of the metal sheets according to the invention or one of its developments are higher performance and efficiency, a smaller required installation space, better geometric properties (which can be achieved for example by means of recompression against a stop, in particular with constant surface pressure, with the advantage of better dimensional stability of the electromagnetic component) and, depending on the design, acoustic advantages.

A surface inspection system may be arranged immediately downstream of the coating station, for example a thermal imaging camera, optionally a layer thickness measuring system, which monitors the coating process and, as a by-product, allows additional quality control with regard to larger defects or holes in the electrical steel strip. For hole detection, a light source can also be integrated into the lamella holder so that, if there are holes, the sensor detects them and automatically ejects the lamella from the process.

The positioning station can contain measuring coils for checking the electromagnetic properties of the core in order to record the influence and measured variables via sensors and store them in a database or, alternatively or additionally, forward them to another system via an interface. Furthermore, it may be the case, for example, that an identification number of a lamella or an electrical component is inscribed into the adhesive coating by means of a laser.

The edges of a laminated core may be cleaned following the method for producing said core in order to remove any adhesive residues on an edge or side of the laminated core. The cleaning can be done chemically and/or mechanically.

Further details, features, and advantages of the subject matter of the invention result from the following description in connection with the drawings, which show embodiments of the invention by way of example.

It goes without saying that the features mentioned above and below can be used not only in the combination indicated but also in other combinations or in isolation.

DETAILED DESCRIPTION

Figure 1:
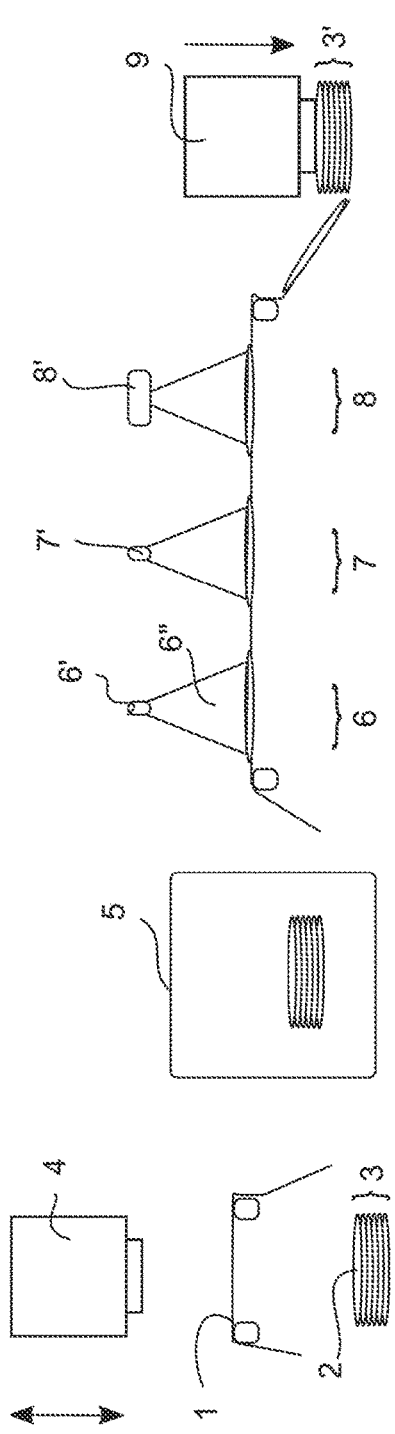
FIG. 1 schematically shows a first development of the invention as an embodiment, FIG. 2 schematically shows an alternative development of the invention as an embodiment.

FIG. 1 schematically shows that a metal sheet 1 designed as a non-grain-oriented electrical steel strip is provided as a starting material. A number of lamellae 2 are punched out of the metal sheet with a punching tool 4 and are collected in a stack 3 in the embodiment shown. After punching, the lamellae are heat-treated in a furnace 5. The exact method of heat treatment is at the discretion of a person skilled in the art and depends in particular on the starting material; if grain growth is no longer desired, the heat treatment can in particular be stress relief annealing known to a person skilled in the art, i.e. slow heating in a temperature range below Ac1, holding in this temperature range for a long time, for example for 60 minutes, and slowly cooling down from room temperature. By carrying out a heat treatment, lamellae are obtained in which residual stresses that are still present due to the punching out, in particular in the edge regions, are removed or at least largely removed. With the lamellae obtained in this way, the joining of the heat-treated lamellae to form the laminated core or a portion of the laminated core can begin. For the joining of the lamellae, each of the lamellae of the number of lamellae is sequentially conveyed to different processing stations by a conveyor belt. In a first work station 6, an adhesive in the form of an aqueous dispersion is applied over the entire surface by means of a spray device 6'. The lamellae then have a thermally activated adhesive coating. Immediately after coating, a test station 7 uses a thermal imaging camera 7' and a connected evaluation device to check that the applied coating is sufficiently free of defects and, if necessary, rejects are discarded. A drying station can optionally also be provided in order to dry the adhesive coating.

The lamellae provided with a sufficiently defect-free coating are then irradiated at an activation station under an NIR illumination device 8' with NIR radiation, preferably with an emission power between 5 kW and 20 kW, to activate the adhesive of the adhesive coating.

After the adhesive has been activated, the lamellae having the activated adhesive are superimposed 3' in a position-aligned and/or angularly aligned manner. A pressure ram 9 then applies a compressive force to the end face of the lamella stack 3', which force axially compresses the laminated core. Preferably, a uniform surface pressure is exerted so that the force exerted in the axial direction is the same at every point on the end face.

Figure 2:
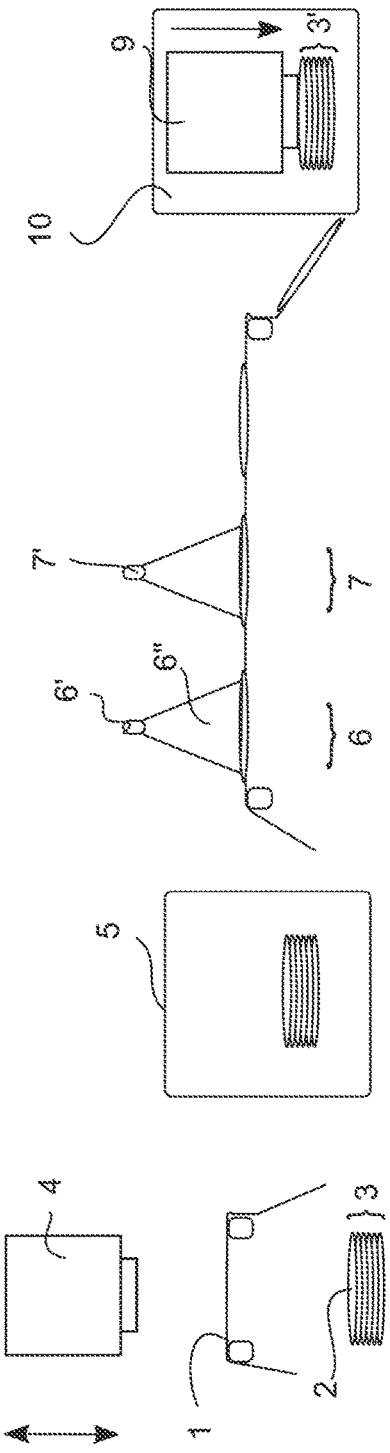

Another embodiment is shown in FIG. 2. This differs from the embodiment shown in FIG. 1 in that no activation station 8 is provided. Instead, the number of lamellae coated at station 6 and inspected at station 7 are superimposed in a position-aligned and/or angularly aligned manner and the lamellae are heated and maintained at a temperature between 100° C. and 250° C. in a furnace 10 for a sufficiently long period of time, for example at least 30 minutes, to activate the adhesive. The compression of the laminated core by applying pressure with a ram 9 takes place at the same time.

Embodiments in which the entire method is carried out in an inline or continuous process are equivalent to the methods shown in FIG. 1 and in FIG. 2; in particular, there is no gathering of the lamellae in the stack 3, but rather the lamellae remain attached to one or more webs, in particular three webs on the metal sheet in order to be transported through the process by transporting the metal sheet. Furthermore, a continuous furnace can be used instead of the furnace 5, for example, and the lamellae can be removed from the metal sheet after step 8 (FIG. 1) or after step 7 (FIG. 2) by separating the webs using a so-called ejection punch known to a person skilled in the art. The processes are functionally equivalent as long as the boundary 10 conditions required according to the invention or required for the developments are implemented by a person skilled in the art.

The invention claimed is:

1. A method for producing an electromagnetic component including at least one of a laminated core, a stator core or a rotor core, for an electric machine, the method comprising:
    providing a metal sheet as a starting material;
    punching out a number of lamellae from the metal sheet;
    heat-treating the number of lamellae to provide heat-treated lamellae; and
    joining the heat-treated lamellae to form the electromagnetic component or a portion of the electromagnetic component,
    wherein the joining of the heat-treated lamellae comprises, sequentially for each of the heat-treated lamellae of the number of lamellae, following steps:
    applying a thermally activated adhesive to a surface of each of the number of lamellae, substantially over a whole surface, to form an adhesive coating,
    superimposing the heat-treated adhesive coated lamellae in a position-aligned and angularly aligned manner,
    applying a compressive force acting in an axial direction to an end face of the superimposed lamellae, and
    heating the superimposed lamellae, which are at least temporarily subjected to the compressive force, for a predetermined period of time at a predetermined temperature to activate the adhesive of the adhesive coating.

2. The method according to claim 1, wherein the predetermined period of time is between 5 minutes and 60 minutes.

3. The method according to claim 2, wherein the predetermined temperature is between 100° C. and 250° C.

4. The method according to claim 1, further comprising inspecting the adhesive coating using an optical inspection method and a respective heat-treated lamella is only used in the joining of the heat-treated lamellae if the optical inspection method detects a sufficiently uniform thickness distribution of the adhesive coating, and otherwise the respective heat-treated lamella is removed from the method as a reject.

5. The method according to claim 1, further comprising inspecting the adhesive coating using an optical inspection method, wherein the optical inspection method includes a capture of a thermal image of the adhesive coating, which is not-yet-dry, by means of a thermal imaging camera.

6. The method according to claim 1, wherein the metal sheet
    is a panel made from an electrical steel strip or is an electrical steel strip or
    is a panel or a strip made of a soft magnetic material.

7. The method according to claim 6, wherein the metal sheet, in addition to Fe and unavoidable impurities, consists of in wt. %:
    0.1 to 3.50 Si,
    0.01 to 1.60 Al,
    0.07 to 0.65 Mn, and
    up to 0.25 P,
    wherein a sum of all components including the unavoidable impurities is 100 wt. %.

8. The method according to claim 1, wherein the metal sheet consists of a non-grain-oriented electrical steel strip.

9. The method according to claim 8, wherein
    the heat treatment is carried out as a stress relief annealing.

10. The method according to claim 1 further comprising applying a thermally activated adhesive on both surfaces of the lamella.

11. The method according to claim 10, wherein the thermally activated adhesive contains:
    60 parts by weight of an epoxy resin;
    0.5 to 15 parts by weight of a latent hardener; and
    1 to 15 parts by weight of a latent accelerator.

* * * * *